(12) United States Patent
Simakov et al.

(10) Patent No.: US 10,975,484 B2
(45) Date of Patent: Apr. 13, 2021

(54) ELECTROLYTE FOR OBTAINING MELTS USING AN ALUMINUM ELECTROLYZER

(71) Applicant: United Company RUSAL Engineering and Technology Centre, LLC, Krasnoyarsk (RU)

(72) Inventors: Dmitry Aleksandrovich Simakov, Krasnoyarsk (RU); Aleksandr Olegovich Gusev, Krasnoyarsk (RU)

(73) Assignee: United Company RUSAL Engineering and Technology Centre LLC, Krasnoyarsk (RU)

( * ) Notice: Subject to any disclaimer, the term of this patent is extended or adjusted under 35 U.S.C. 154(b) by 0 days.

(21) Appl. No.: 14/902,947

(22) PCT Filed: Jul. 9, 2013

(86) PCT No.: PCT/RU2013/000590
§ 371 (c)(1),
(2) Date: Jan. 8, 2016

(87) PCT Pub. No.: WO2015/005817
PCT Pub. Date: Jan. 15, 2015

(65) Prior Publication Data
US 2016/0145753 A1 May 26, 2016

(51) Int. Cl.
*C25C 3/18* (2006.01)
*C01F 7/54* (2006.01)

(52) U.S. Cl.
CPC . *C25C 3/18* (2013.01); *C01F 7/54* (2013.01)

(58) Field of Classification Search
CPC .... C25C 3/06; C25C 3/18; C25C 3/00; C25C 7/005
USPC ........................................................ 205/395
See application file for complete search history.

(56) References Cited

U.S. PATENT DOCUMENTS

| | | | | |
|---|---|---|---|---|
| 3,951,763 | A * | 4/1976 | Sleppy | C25C 3/06 205/394 |
| 3,996,117 | A * | 12/1976 | Graham | C25C 3/18 205/392 |
| 2007/0193878 | A1* | 8/2007 | Nguyen | C25C 3/08 204/243.1 |
| 2011/0031129 | A1* | 2/2011 | de Nora | C25C 3/12 205/372 |
| 2013/0092551 | A1 | 4/2013 | Chen et al. | |

FOREIGN PATENT DOCUMENTS

| | | |
|---|---|---|
| CN | 1896329 A | 1/2004 |
| RU | 2288977 C1 | 12/2006 |
| RU | 2341591 C2 | 12/2008 |
| RU | 2415973 C2 | 4/2011 |
| WO | 2011072546 | 6/2011 |
| WO | 2012042075 A1 | 4/2012 |

OTHER PUBLICATIONS

Wang et al, A Multiple Regression Equation for the Electrical Conductivity of Cryolitic Melts, Light Metals, 1993 (no month available), pp. 247-255 (Year: 1993).*
Cassayre et al, Properties of Low-Temperature Melting Electrolytes for the Aluminum Electrolysis Process: A Review, Journal of Chemical and Engineering Data, vol. 55. No. 11, Oct. 2010, pp. 4549-4560 (Year: 2010).*
Apisarov et al, Liquidus Temperatures of Cryoltie Melts with Low Cryolite Ratio, Metallurgical and Materials Transactions B, vol. 42, No. 1, Dec. 2010, pp. 236-242 (Year: 2010).*
Apisarov et al, Pysicochemical Properties of KF-NaF-AlF3 molten electrolytes, Russian Journal of Electrochemistry, Jun. 2010, vol. 46, No. 6, pp. 633-639 (Year: 2010).*
Apisarov et al, Liquidus Temperatures of Cryolite Melts with Low Cryolite Ratio, Metallurgical and Materials Transactions B, Feb. 2011, vol. 42, No. 1, pp. 236-242 (Year: 2011).*
Danielik et al, Phase Diagram of the System NaF-KF-AlF3, Journal of Thermal Analysis and Calorimetry, Jun. 2004, vol. 76, No. 3, pp. 763-773 (Year: 2004).*
Yan et al, Alumina Solubility in KF-NaF-AlF3-Based Low Temperature Electrolyte, Metallurgical and Materials Transactions B, Oct. 2011, vol. 42, No. 5, pp. 1065-1070 (Year: 2011).*
Huang, Study on the electrical conductivity of NaF-KF-LiF-AlF3 electrolyte melts for aluminum electrolysis, Master's Degree Thesis, School of Metallurgical Science and Engineering, Central South University, Hunan, China, 2009 (no month), pp. 1-65 (Year: 2009).*
Partial translation (pp. 1-43) of Huang (Year: 2009).*
Partial translation (pp. 44-65) of Huang (Year: 2009).*
Solheim et al, Liquidus Temperatures for Primary Crystallization of Cryolite in Molten Salt Systems of Interest for Aluminum Electrolysis, Metallurgical and Materials Transactions B, vol. 27B, Oct. 1996, pp. 739-744 (Year: 1996).*
International Search Report issued for PCT/RU2013/000590 dated Apr. 10, 2014.

* cited by examiner

*Primary Examiner* — Harry D Wilkins, III
(74) *Attorney, Agent, or Firm* — Hogan Lovells US LLP

(57) ABSTRACT

The invention concerns non-ferrous metallurgy, in particular the composition of an electrolyte for electrically obtaining aluminum by the electrolysis of fluoride melts. The electrolyte proposed contains, in % by weight: sodium fluoride 26-43, potassium fluoride up to 12, lithium fluoride up to 5, calcium fluoride 2-6, alumina 2-6, aluminum fluoride and admixtures—the remainder. The technical result is to increase the solubility of alumina in the electrolyte at a temperature of 830-930° C. In the electrolyte being applied for, the carbon and inert electrode materials are not destroyed, and the use of special methods to purify the aluminum of melt components is not required.

2 Claims, No Drawings

ELECTROLYTE FOR OBTAINING MELTS USING AN ALUMINUM ELECTROLYZER

The invention concerns non-ferrous metallurgy, in particular the composition of an electrolyte for electrolytically obtaining aluminum by means of the electrolysis of fluoride melts.

At the present time, aluminum is obtained in electrolytic baths (electrolyzers) by means of the electrolytic decomposition of aluminum oxide, or alumina ($Al_2O_3$), dissolved in a fluoride melt at a temperature of about 950° C. The principal component of the melt is sodium cryolite ($Na_3AlF_6$), to which are added aluminum fluoride ($AlF_3$), alkali fluorides, and alkaline-earth metals such as lithium fluoride (LiF), potassium fluoride (KF), calcium fluoride ($CaF_2$), and magnesium fluoride ($MgF_2$), for example, in order to improve the technical characteristics. As a result of the introduction of the additives, melt properties that are important for electrolysis technology are altered, such as electrical conductivity, density, liquidus temperature (melting point), alumina solubility, vapor pressure above the melt, and corrosive action upon the materials of the electrodes, the refractory, and other elements of the electrolyzer construction.

The production of aluminum by electrolysis is one of the most energy-intensive processes. In order to reduce the specific consumption of electrical power, attempts are made to reduce the specific resistance of the electrolyte and the electrolysis temperature. Reducing the electrolysis temperature in addition allows corrosion of the electrode, refractory, and construction materials to be reduced. But in reducing the electrolysis temperature and, consequently, the electrolyte temperature, alumina solubility in the melt is usually reduced, which leads to the necessity to reduce electrolyzer productivity.

From the patent RU2288977, published on Dec. 10, 2006, an electrolyte is known with an elevated electrical conductivity and alumina solubility, which contains, in % by wt.:
KF—4.0-7.0,
LiF—1.0-3.0,
$CaF_2$—4.0-5.0,
$MgF_2$—0.5-1.5,
$AlF_3$ (excess)—4.0-6.0,
$Al_2O_3$—2.0-4.0,
$Na_3AlF_6$—remainder.

At a temperature of 955° C., this electrolyte has an electrical conductivity of 2.6 $\Omega^{-1}$ $cm^{-1}$ and an alumina solubility of 8.7%$_{wt}$. An increase in the electrical conductivity of the electrolyte is achieved by introducing a lithium fluoride additive, while an increase in alumina solubility is attained by the introduction of an additive of potassium fluoride. A drawback of the electrolyte is its high liquidus temperature, which does not allow the electrolysis temperature to be reduced below 950° C. As a result of this, electrolyzers have high energy loss in the form of heat dissipated, and the energy efficiency of the process remains low, since the efficiency of existing electrolyzers does not exceed 50%. In addition, the high electrolysis temperature leads to a high rate of destruction for the electrode, construction, and refractory materials. In particular, the list of possible materials is essentially limited to those suitable for use as inert anodes.

An electrolyte is known (patent WO2011/072546) with a lower liquidus temperature, containing, in %$_{wt}$:
KF—10-50,
NaF—0-35,
LiF—0-3,
$Al_2O_3$—2-6,
$CaF_2$—0-5,
$MgF_2$—0-3,
$AlF_3$ and admixtures—remainder.

It follows from the patent specification that the liquidus temperature of the electrolyte is 560-800° C. and at 700-800° C., the solubility of alumina in said electrolyte is equal to 3-8%, while the density is 1.8-2.1 g/cm³. The electrolysis temperature for this electrolyte can be reduced to 690-850° C. One drawback of the known electrolyte is the high content of potassium fluoride, which does not allow carbon electrode materials to be used, due to their destruction as a result of introducing potassium into the structure of the carbon materials. In addition, a drawback of the known electrolyte is its high electrical conductivity due to the low content of sodium and lithium fluorides at a low electrolysis temperature. This leads to an increase in electrolyzer voltage and does not allow the efficiency of electrolyzers to be improved, compared with modern electrolyzers with an electrolysis temperature of about 950° C.

An electrolyte was selected (from patent CN1896329) as the closest analogue (a prototype) for obtaining aluminum by electrolysis, said electrolyte containing, in %$_{wt}$:
$AlF_3$—5-30,
LiF—2-40,
$CaF_2$—2-6,
$MgF_2$—2-8,
KF—2-10,
$Al_2O_3$—2-2.5,
$Na_3AlF_6$—remainder.

The liquidus temperature of the electrolyte based on the prototype is 800-850° C., while the density and electrical conductivity are 1.8-2.1 g/cm³ and 3-4 $\Omega^{-1}$ $cm^{-1}$, respectively. A drawback of the prototype electrolyte is the high content of lithium and magnesium fluorides, which severely reduces the solubility of alumina in the electrolyte. Aluminum oxide content in this electrolyte is therefore limited to 2-2.5%$_{wt}$. Because of the reduced solubility of alumina, its rate of solution is also reduced, and since the aluminum is obtained by the decomposition of dissolved alumina, this necessarily demands a reduction in electrolyzer productivity. In addition, reducing the solubility and solution rate of alumina in the electrolyte increases the rate of precipitation for undissolved alumina at the bottom of the electrolyzer, while a high lithium content leads to the aluminum being significantly contaminated with lithium, which requires the application of special methods to purify the metal obtained.

The principal trait of the prototype and of the electrolyte being proposed here is the reduction in liquidus temperature by modifying the electrolyte composition using the additives KF, LiF, and $CaF_2$.

The task of the invention is the increase productivity and to reduce the cost price of obtaining aluminum at an electrolysis temperature of 830-930° C.

The technical result is an increase in alumina solubility in the electrolyte at the temperature of 830-930° C. In the electrolyte being applied for, the carbon and inert electrode materials are not destroyed, and the use of special methods is not required to purify the aluminum of melt components.

The problem posed is solved, in that the electrolyte for obtaining aluminum by the electrolysis of melts contains, according to the composition being applied for, sodium fluoride, potassium fluoride, lithium fluoride, calcium fluoride, and alumina, and aluminum fluoride and admixtures, in the following quantitative component proportions, in %$_{wt}$:
NaF—26-43,
KF—up to 12, LiF—up to 5,
CaF$_2$—2-6,
Al$_2$O$_3$—2-6,
AlF$_3$ and admixtures—remainder.

The admixtures in the electrolyte are usually the oxide and fluoride constituents of iron, silicon, magnesium, etc. The electrolyte has a liquidus temperature of 750-900° C., and at an electrolysis temperature of 830-930° C., it has an alumina solubility of over 5%$_{wt}$. During electrolysis, the electrolyte does not destroy the carbon and inert electrode materials, and the aluminum being obtained is not contaminated with melt components, particularly lithium.

The essence of the proposed solution is as follows.

Use of an electrolyte with a reduced liquidus temperature at an electrolysis temperature of 830-930° C. allows productivity to be increased in the process of obtaining aluminum by the electrolysis of molten salts and the cost price of obtaining aluminum to be reduced.

Sodium fluoride and aluminum fluoride are the principal components of the electrolyte. At a NaF content of less than 26%$_{wt}$, the electrical conductivity of solubility of alumina is significantly reduced. A content of more than 43%$_{wt}$ NaF does not allow the electrolysis temperature to be reduced to less than 930° C.

Lowering the liquidus temperature is also achieved by introducing the additives KF, LiF, and CaF$_2$. All these additives, other than KF, cause a reduction in the solubility of aluminum oxide in the melt. At the same time, the electrical conductivity of the electrolyte is reduced by introducing potassium fluoride, and the destruction of carbon materials is accelerated as a result of introducing potassium into their structure. Decreasing the electrolyte temperature also leads to a decrease in alumina solubility. Therefore, the lower the electrolyte temperature, the greater the content of potassium fluoride must be. However, with a content of KF greater than 12%$_{wt}$, deformation and destruction of carbon anodes and cathodes occurs, due to introducing potassium into them, and the electrical conductivity of the electrolyte is substantially reduced in addition.

A LiF additive is used to increase the electrical conductivity of the electrolyte and simultaneously decrease the liquidus temperature. But at a LiF content of more than 5%$_{wt}$ (up to 40%$_{wt}$ in the prototype) and an electrolyte temperature of less than 930° C., the solubility of the alumina in the melt is substantially reduced. In addition, lithium concentration in the aluminum rises with a lithium content of more than 5%$_{wt}$, which requires the application of special methods to purify the metal obtained. Otherwise problems arise during its processing, for example during the manufacture of aluminum foil [B. J. Welch et. al., Aluminium smelter technology: theory and practice].

A content of 2-6%$_{wt}$ calcium fluoride cannot be avoided, due to the input of calcium into the electrolyte in the alumina composition. The additional introduction of calcium fluoride above that of background leads to a decrease in alumina solubility and the electrical conductivity of the melt.

Magnesium fluoride alters the properties of the electrolyte analogously to calcium fluoride, but the background content of magnesium fluoride here is considerably lower and may therefore pertain to admixture contamination of the melt. The additional introduction of magnesium fluoride (2-8%$_{wt}$ in the prototype) leads, as in the case of calcium fluoride, to a decrease in alumina solubility and in electrical conductivity of the melt.

With low alumina solubility in the electrolyte (not more than 4-5%$_{wt}$ in the prototype) and high anode current density (0.8 A/cm$^2$ or more), the concentration of alumina dissolved in the melt can be less than 2%$_{wt}$. Then the deficit in oxygen-bearing ions rises at the surface of the anodes, and the decomposition of the fluoride components of the electrolyte begins, which leads to an increase in electrolyzer voltage, anode degradation, elevated consumption of the fluorine salts, and the evolution of deleterious fluorine-bearing gases. At a concentration higher than 6% wt, the formation of alumina precipitates is possible in the electrolyzer, which disrupts the electrolysis process technologically.

The existence of a cause-and-effect relationship between the aggregate essential traits of the subject being applied for and the achievable technical result is shown in the table.

TABLE

| Type of technical result and their dimensions | Actual or calculated indices | | | Explanation, whereby (distinguishing traits and/or an aggregate thereof) improvement was possible in the indices of the proposed subject, compared with the |
|---|---|---|---|---|
| | Prototype | Subject being applied for | prototype | |
| Composition, %$_{wt}$ | AlF$_3$ = 30<br>LiF = 10<br>CaF$_2$ = 2.5<br>MgF$_2$ = 2.5<br>KF = 2.5<br>Al$_2$O$_3$ = 2.5<br>Na$_3$AlF$_6$ - 50 (of these, NaF = 30) | NaF = 26<br>KF = 12<br>LiF = 5<br>CaF$_2$ = 2.5<br>Al$_2$O$_3$ = 2.5<br>AlF$_3$ = 52 | NaF = 43<br>CaF$_2$ = 5<br>Al$_2$O$_3$ = 5<br>AlF$_3$ = 47 | A decrease in the content of lithium fluoride and a corresponding increase in total content of sodium fluoride and potassium fluoride, i.e. components increasing the solubility of alumina in the electrolyte being applied for compared with the prototype, ensure an increase in the solubility of alumina in the electrolyte at a temperature of 830-930° C. |
| Liquidus temperature, ° C. | 839 | 750 | 900 | |
| Operating temperature, ° C. | 830 | 830 | 930 | |
| Specific electrical conductivity (at operating temperature), Ω/$^{-1}$ cm$^{-1}$ | 2.5 | 1.7 | 2.0 | |

TABLE-continued

| Type of technical result and their dimensions | Actual or calculated indices | | Explanation, whereby (distinguishing traits and/or an aggregate thereof) improvement was possible in the indices of the proposed subject, compared with the |
|---|---|---|---|
| | Prototype | Subject being applied for prototype | |
| Solubility of alumina (at operating temperature), % wt | 2.3 | 5.2    7.5 | |

Thus, the invention allows, at a temperature of 830-930° C., the solubility of alumina in the electrolyte to be increased up to 5% wt or more and, consequently, allows the productivity of electrolyzers operating at an electrolysis temperature of 830-930° C. to be increased. In addition, the invention allows aluminum to be obtained which is not contaminated with lithium and which does not require the application of special purification methods. Consequently, the invention allows the cost price of obtaining aluminum to be reduced.

The invention claimed is:

1. An electrolyte for obtaining aluminum by the electrolysis of melts consisting of components in the following quantitative proportions, in % by weight:
NaF—26,
KF—12,
LiF—5,
$CaF_2$—2 to 2.5,
$Al_2O_3$—2 to 2.5,
$AlF_3$—remainder,
wherein the electrolyte has an alumina solubility of about 5 wt % at a temperature of 830-930° C., has a liquidus temperature of about 750° C., and has a specific electrical conductivity of about 1.7 $\Omega^{-1}$ $cm^{-1}$ at a temperature of 830° C.

2. An electrolyte for obtaining aluminum by the electrolysis of melts consisting of components in the following quantitative proportions, in % by weight:
NaF—43,
$CaF_2$—5 to 6,
$Al_2O_3$—5 to 6,
$AlF_3$—remainder,
wherein the electrolyte has an alumina solubility of about 7.5 wt % at a temperature of 830-930° C., has a liquidus temperature of about 900° C., and has a specific electrical conductivity of about 2.0 $\Omega^{-1}$ $cm^{-1}$ at a temperature of 930° C.

* * * * *